(12) United States Patent
Han et al.

(10) Patent No.: US 8,807,500 B2
(45) Date of Patent: Aug. 19, 2014

(54) FIXING APPARATUS FOR HARD DISK DRIVE

(75) Inventors: He-Tao Han, Shenzhen (CN); Song Deng, Shenzhen (CN); Jun-Hua Tan, Shenzhen (CN); Wen-Kang Lo, New Taipei (TW); Guang-Yao Lee, New Taipei (TW)

(73) Assignees: Hong Fu Jin Precision Industry (ShenZhen) Co., Ltd., Shenzhen (CN); Hon Hai Precision Industry Co., Ltd., New Taipei (TW)

( * ) Notice: Subject to any disclaimer, the term of this patent is extended or adjusted under 35 U.S.C. 154(b) by 82 days.

(21) Appl. No.: 13/314,194

(22) Filed: Dec. 8, 2011

(65) Prior Publication Data
US 2013/0068907 A1  Mar. 21, 2013

(30) Foreign Application Priority Data
Sep. 16, 2011  (CN) .......................... 2011 1 0275064

(51) Int. Cl.
 *A47B 96/06* (2006.01)
 *F16M 11/20* (2006.01)
 *G06F 1/16* (2006.01)

(52) U.S. Cl.
 USPC ................. 248/220.21; 248/200; 248/221.11; 361/679.31

(58) Field of Classification Search
 USPC ................. 312/223.1, 223.2; 361/679.31–39, 361/679.59, 725, 724, 726, 727, 732; 248/27.1, 27.3, 220.21, 221.11, 271.1, 248/222.11
 See application file for complete search history.

(56) References Cited

U.S. PATENT DOCUMENTS 7,441,744 B2 * 10/2008 Chen et al. ..................... 248/694

* cited by examiner

*Primary Examiner* — Jonathan Liu
*Assistant Examiner* — Erin W Smith
(74) *Attorney, Agent, or Firm* — Novak Druce Connolly Bove + Quigg LLP

(57) ABSTRACT

A fixing apparatus for fixing a hard disk drive includes a bracket receiving the hard disk drive with a locating pin extending from each of opposite sidewalls, and a rotating member. The bracket includes two opposite supporting walls and an end wall. Each supporting wall defines a latching slot. The locating pins are slidably inserted into the corresponding latching slots. The rotating member includes a fixing pole slidably abutting against the hard disk drive toward the end wall, two rotating poles respectively extending from two opposite ends of the fixing pole and rotatably connected to the corresponding supporting walls, and a latching pole extending from a distal end of one of the rotating poles to be detachably latched to one of the supporting walls.

7 Claims, 4 Drawing Sheets

FIXING APPARATUS FOR HARD DISK DRIVE

BACKGROUND

1. Technical Field

The present disclosure relates to an apparatus for fixing a hard disk drive.

2. Description of Related Art

An electronic device, such as a computer, generally includes a frame, and a plurality of screws to fix a hard disk drive to the frame. However, these screws are usually small and difficult to handle, thus the installation of the hard disk drive in the computer is labor-intensive.

BRIEF DESCRIPTION OF THE DRAWINGS

Many aspects of the present embodiments can be better understood with reference to the following drawings. The components in the drawings are not necessarily drawn to scale, the emphasis instead being placed upon clearly illustrating the principles of the present embodiments. Moreover, in the drawing, all the views are schematic, and like reference numerals designate corresponding parts throughout the several views.

DETAILED DESCRIPTION

The disclosure, including the accompanying drawings, is illustrated by way of example and not by way of limitation. It should be noted that references to "an" or "one" embodiment in this disclosure are not necessarily to the same embodiment, and such references mean at least one.

Figure 1:
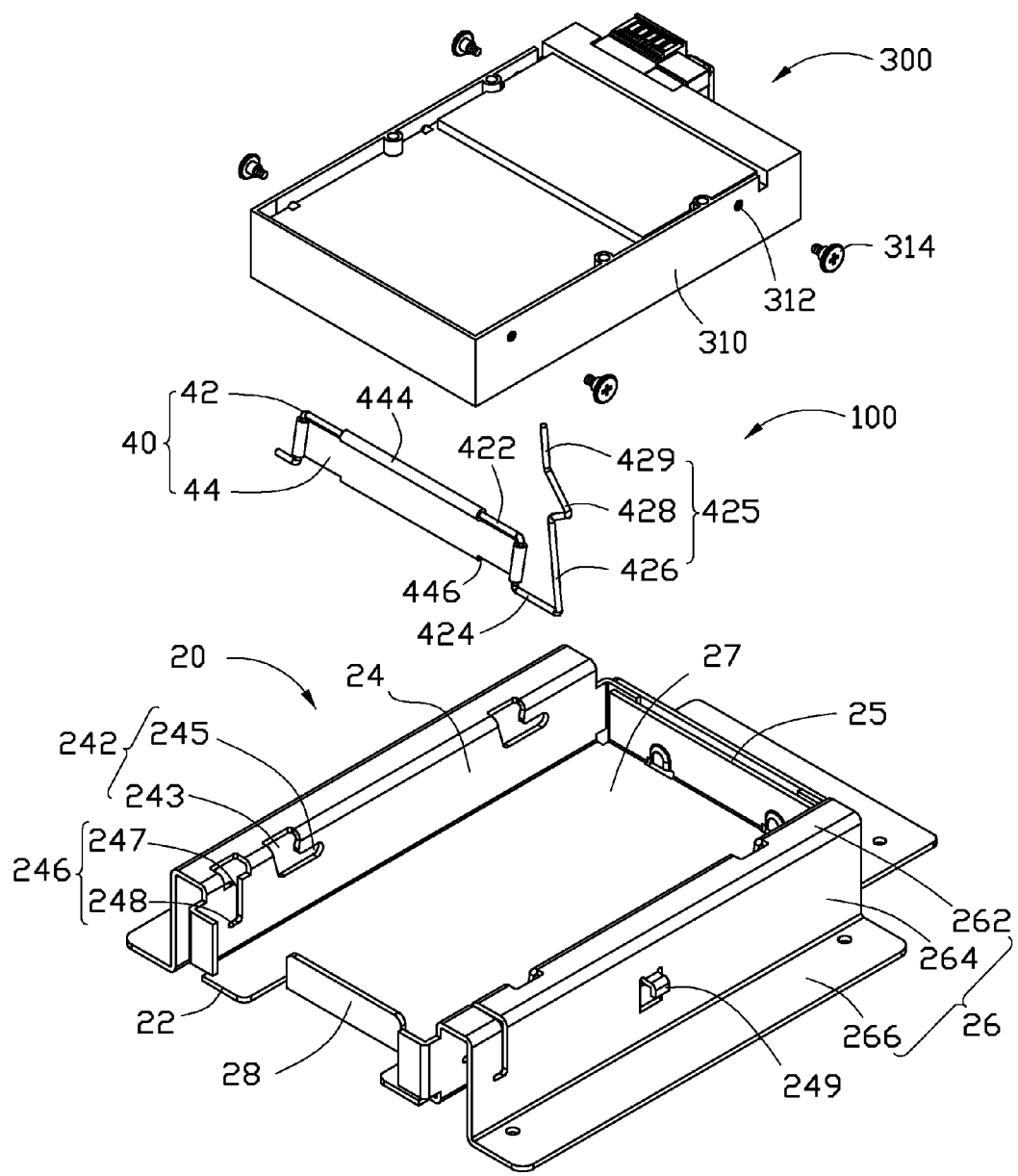
FIG. 1 is an exploded, isometric view of an exemplary embodiment of a fixing apparatus together with a hard disk drive.

Referring to FIG. 1, an embodiment of a fixing apparatus 100 is provided to fix a hard disk drive 300. The hard disk drive 300 includes two opposite sidewalls 310. Each sidewall 310 defines two fixing holes 312. Four locating pins 314 can be fixed to the fixing holes 312. In the embodiment, the fixing holes 312 are screw holes, and the locating pins 314 are screws. The fixing apparatus 100 includes a bracket 20 and a rotating assembly 40.

The bracket 20 includes a rectangular bottom wall 22, two supporting walls 24 perpendicularly extending up from two opposite sides of the bottom wall 22, and an end wall 25 perpendicularly extending up from a first end of the bottom wall 22 and connected between two first ends of the supporting walls 24. The bottom wall 22, the supporting walls 24, and the end wall 25 cooperatively bound a receiving space 27. A stopping plate 28 perpendicularly extends up from a second end of the bottom wall 22 opposite to the end wall 25.

A mounting portion 26 extends out from a top side of each supporting wall 24. Each mounting portion 26 includes an extending plate 262 perpendicularly extending out from the supporting wall 24 parallel to the bottom wall 22, a connecting plate 264 perpendicularly extending down from the extending plate 262 and parallel to the supporting wall 24, and a mounting plate 266 perpendicularly extending out from a bottom side of the connecting plate 264 and coplanar with the bottom wall 22. Each supporting wall 24 defines two L-shaped latching slots 242 respectively in opposite ends, and an L-shaped rotation slot 246 in a second end of the supporting wall 24 opposite to the first end. The latching slots 242 are located between the end wall 25 and the rotation slot 246 of each supporting wall 24. Each latching slot 242 includes an access 243 extending down from a top of the supporting wall 24, and a slide groove 245 extending from a bottom end of the access 243 toward the end wall 25. The access 243 extends through the extending plate 262. Each rotation slot 246 includes a guiding groove 247 extending down from the top of the supporting wall 24, and a rotation hole 248 extending from a bottom end of the guiding groove 247 away from the end wall 25. The guiding groove 247 extends through the extending plate 262. A hook 249 extends out from a middle of one of the connecting plate 264 away from the supporting wall 24.

The mounting plates 266 are fixed to a frame of an electronic device (not shown) by screwing or riveting.

In anther embodiment, the bottom wall 22 can be directly fixed to the frame of the electronic device. The mounting portions 26 can be omitted, and the hook 249 directly extends out from the corresponding supporting wall 24 away from the receiving space 27.

The rotating assembly 40 includes a rotating member 42 and an abutting member 44 fixed to the rotating member 42.

The rotating member 42 includes a U-shaped fixing pole 422, two rotating poles 424 perpendicularly extending out from two opposite ends of the fixing pole 422 away from each other, and a resilient latching pole 425 extending from a distal end of one of the rotating poles 424 and adjacent to the fixing pole 422. The latching pole 425 includes a connecting portion 426 slantingly extending up from the rotating pole 424 toward the fixing pole 422, a substantially V-shaped operation portion 428 extending from a distal end of the connecting portion 426 opposite to the rotating pole 424, and a latching portion 429 extending from a distal end of the operation portion 428 opposite to the connecting portion 426. In the embodiment, the rotating member 42 is made of resilient material, such as a resilient steel wire.

The abutting member 44 is fixed to the fixing pole 422. A fixing portion 444 protrudes from each of a side and two opposite ends of the abutting member 44, for fitting about the fixing pole 422. An abutting portion 446 extends down from an opposite side of the abutting member 44.

Figure 2:
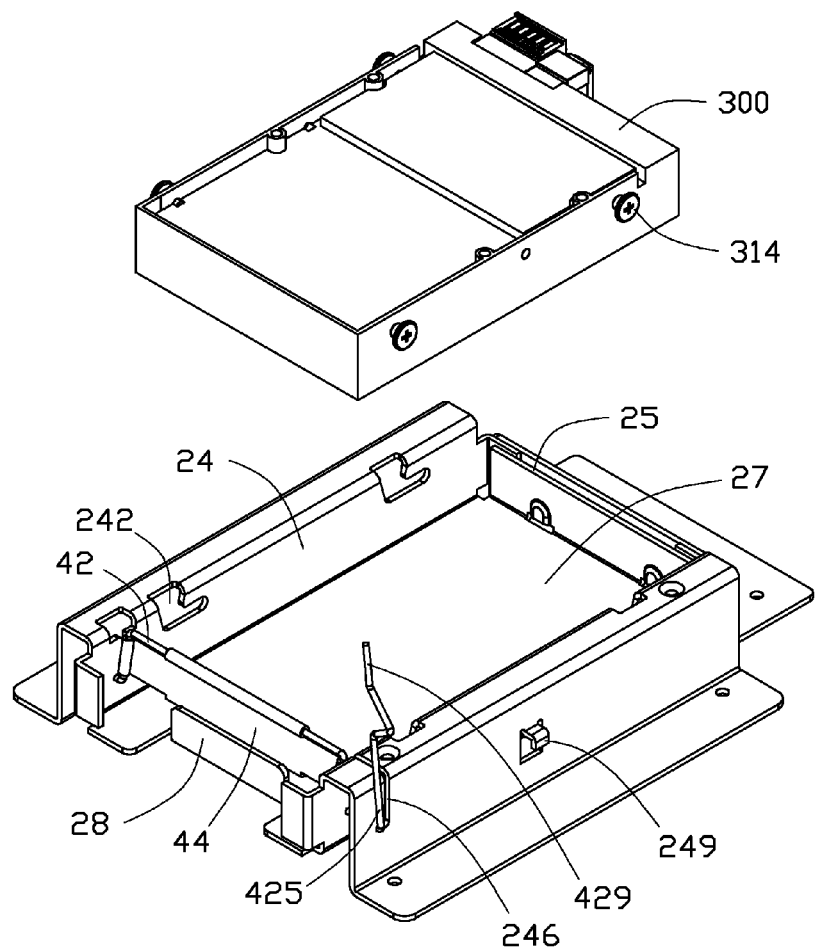
FIG. 2 is a partly assembled, isometric view of FIG. 1.

Referring to FIG. 2, in assembly, the rotating poles 424 are rotatably inserted into the corresponding rotation holes 248 from the corresponding guiding grooves 247. Therefore, the rotating assembly 40 is rotatably assembled to the bracket 20. The latching pole 425 and the hook 249 are located at a same side of the bracket 20, thus the latching portion 429 can be latched to or detached from the hook 249.

Figure 3:
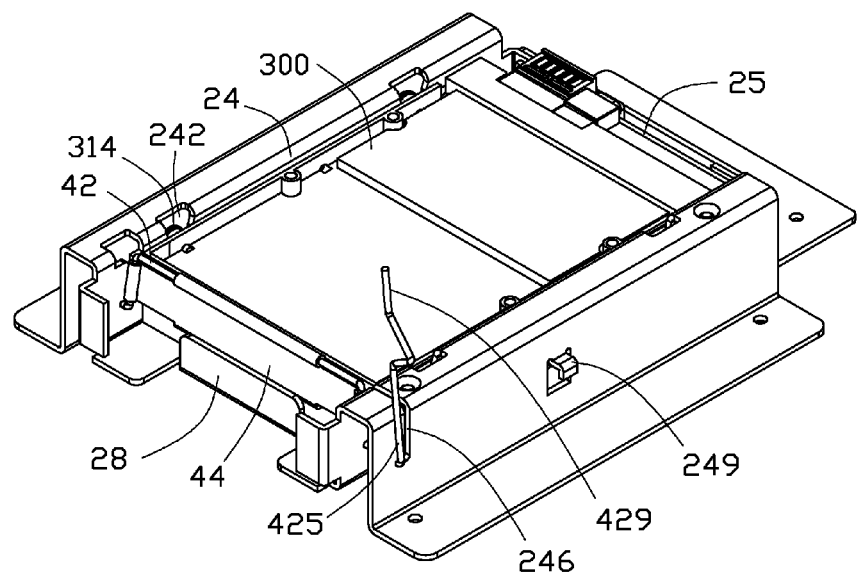
FIGS. 3-4 are assembled, isometric views of the fixing apparatus and the hard disk drive of FIG. 1, but show different processes of assembling the hard disk drive.
Figure 4:
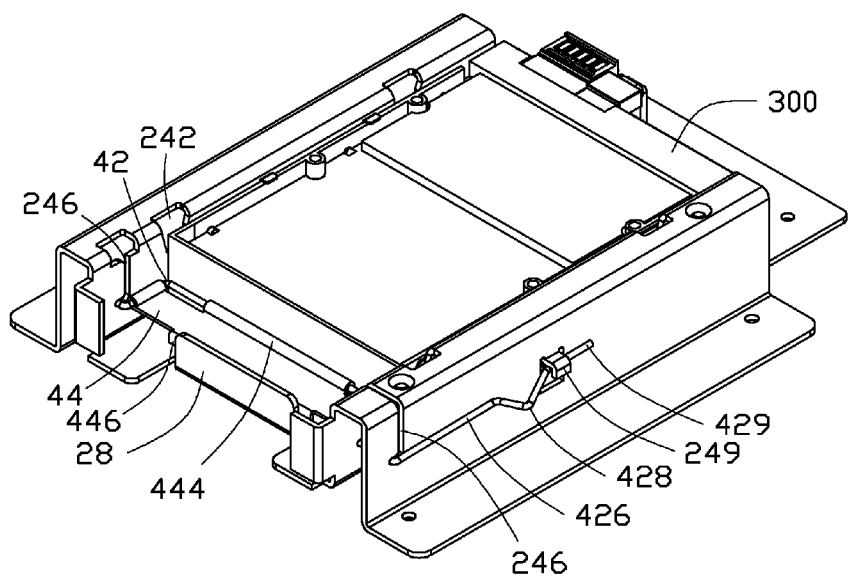

Referring to FIGS. 3-4, in assembly of the hard disk drive 300 to the fixing apparatus 100, the locating pins 314 are respectively fixed into the fixing holes 312. The operating portion 428 is operated to rotate the rotating assembly 40 about the rotating poles 424, until the abutting member 44 is substantially parallel to the stopping plate 28. The hard disk drive 300 is received in the receiving space 27, each locating pin 314 is inserted into a corresponding slide groove 245 from the corresponding access 243. The operation portion 428 is operated to allow the abutting member 44 to rotate about the rotating poles 424. The fixing portion 444 opposite to the abutting portion 446 slidably abuts against a corresponding end of the hard disk drive 300, to move the hard disk drive 300 toward the end wall 25. Each locating pin 314 slides along the corresponding slide groove 245, until blocked by a blind end of the corresponding slide groove 245 adjacent to the end wall 25. The abutting portion 446 slidably abuts against the stopping plate 28, until the abutting member 44 is perpendicularly abutted against the hard disk drive 300 and the stopping plate 28. The connecting portion 426 is deformed away from the connecting plate 264, until the latching portion 429 is latched to the hook 249. The hard disk drive 300 is thus assembled to the fixing apparatus 100.

When disassembling the hard disk drive 300, the operation portion 428 is operated to allow the latching portion 429 to disengage from the hook 249. The abutting member 44 is rotated away from the hard disk drive 300. The fixing portion 444 is disengaged from the hard disk drive 300, and the abutting portion 446 is disengaged from the stopping plate 28. The hard disk drive 300 is pulled away from the end wall 25, each locating pin 314 slides along the corresponding slide groove 245 toward the corresponding access 243. After locating pin 314 moves to the access 243, the hard disk drive 300 can be moved out of the receiving space 27.

Even though numerous characteristics and advantages of the embodiments have been set forth in the foregoing description, together with details of the structure and the functions of the embodiments, the disclosure is illustrative only, and changes may be made in details, especially in matters of shape, size, and arrangement of parts within the principles of the embodiments to the full extent indicated by the broad general meaning of the terms in which the appended claims are expressed.

What is claimed is:

1. A fixing apparatus for a hard disk drive comprising a locating pin protruding from each of opposite sidewalls, the fixing apparatus comprising:
   a bracket for receiving the hard disk drive, the bracket comprising two opposite supporting walls for sandwiching the sidewalls, and an end wall connected between first ends of the supporting walls, each supporting wall defining a latching slot for slidably receiving a corresponding one of the locating pins; and
   a rotating assembly comprising a rotating member, the rotating member comprising a fixing pole slidably for abutting against an end of the hard disk drive toward the end wall, two rotating poles respectively extending out from two opposite ends of the fixing pole and rotatably and respectively connected to second ends of the supporting walls opposite to the end wall, and a latching pole extending from a distal end of one of the two rotating poles opposite to the fixing pole and detachably latched to one of the supporting walls;
   wherein a substantially L-shaped rotating slot is defined in the second end of each supporting wall, the substantially L-shaped rotating slot comprises a guiding groove extending down from a top of the corresponding supporting wall, and a rotation hole extending from a bottom end of the guiding groove away from the end wall, the rotating member is rotatably inserted into the rotation holes from the guiding grooves.

2. The fixing apparatus of claim 1, wherein the fixing pole is substantially U-shaped, the rotating poles extend out from two opposite ends of the fixing pole away from each other, the latching pole extends from the corresponding rotating pole and adjacent to the fixing pole.

3. The fixing apparatus of claim 2, wherein a hook protrudes out from one of the supporting walls, the latching pole comprises a resilient connecting portion extending from the rotating pole, an operation portion extending out from a distal end of the connecting portion away from the fixing pole, and a latching portion extending from a distal end of the operation portion to be detachably latched to the hook.

4. The fixing apparatus of claim 3, wherein the latching pole is substantially V-shaped.

5. The fixing apparatus of claim 3, wherein the rotating assembly further comprises an abutting member fixed to the fixing pole, the bracket further comprises a bottom wall connected between bottoms of the supporting walls and a bottom of the end wall, and a stopping plate extending up from the bottom wall opposite to the end wall, the operation portion is operable to rotate to drive the abutting member to abut against the stopping plate with a first side, thereby a second side of the abutting member opposite to the first side abuts against the hard disk drive toward the end wall.

6. The fixing apparatus of claim 1, wherein each latching slot comprises an access defined in the corresponding supporting wall and extending through the top of the corresponding supporting wall, and a slide groove extending from a bottom end of the access toward the end wall, each locating pin is operable to slidably insert into the corresponding slide groove from the corresponding access.

7. The fixing apparatus of claim 1, wherein the rotating member is made of resilient material.

* * * * *